United States Patent [19]

Brun

[11] Patent Number: 5,166,110
[45] Date of Patent: Nov. 24, 1992

[54] PROCESS FOR THE SYNTHESIS OF ZIEGLER-TYPE CATALYTIC SOLIDS OR SOLID CONSTITUENTS OF THE SAME

[75] Inventor: Claude Brun, Idron, France

[73] Assignee: Elf Atochem S.A., Paris-La-Defense, France

[21] Appl. No.: 629,849

[22] Filed: Dec. 19, 1990

[30] Foreign Application Priority Data

Dec. 22, 1989 [FR] France .................. 89 17071

[51] Int. Cl.$^5$ ................... C08F 4/64; C08F 4/68; C08F 4/69
[52] U.S. Cl. ................... 502/62; 502/104; 502/107; 502/108
[58] Field of Search .............. 502/62, 104, 107, 108

[56] References Cited

U.S. PATENT DOCUMENTS 4,487,846 12/1984 Bailly et al. ............. 502/104 X
4,490,475 12/1984 Bailly et al. ............. 502/104 X
4,497,904  2/1985 Blaya et al. ............. 502/104
4,721,763  1/1988 Bailly et al. ............. 502/108 X Primary Examiner—Patrick P. Garvin
Attorney, Agent, or Firm—Oblon, Spivak, McClelland, Maier & Neustadt

[57] ABSTRACT

A process is provided for the synthesis of a solid Ziegler catalyst or of a transition metal solid constituent thereof, which entails preparing the solid catalyst or constituent thereof as a suspension in an inert liquid medium by contacting precursors or ingredients of the catalyst or of the constituent in the inert liquid medium in one or more steps, and drying the suspension, and collecting the catalyst or constituent thereof; and wherein the process is conducted in a single multi-function reactor having a longitudinal axis and which can pivot around an axis which intersects perpendicularly with this axis.

16 Claims, 2 Drawing Sheets

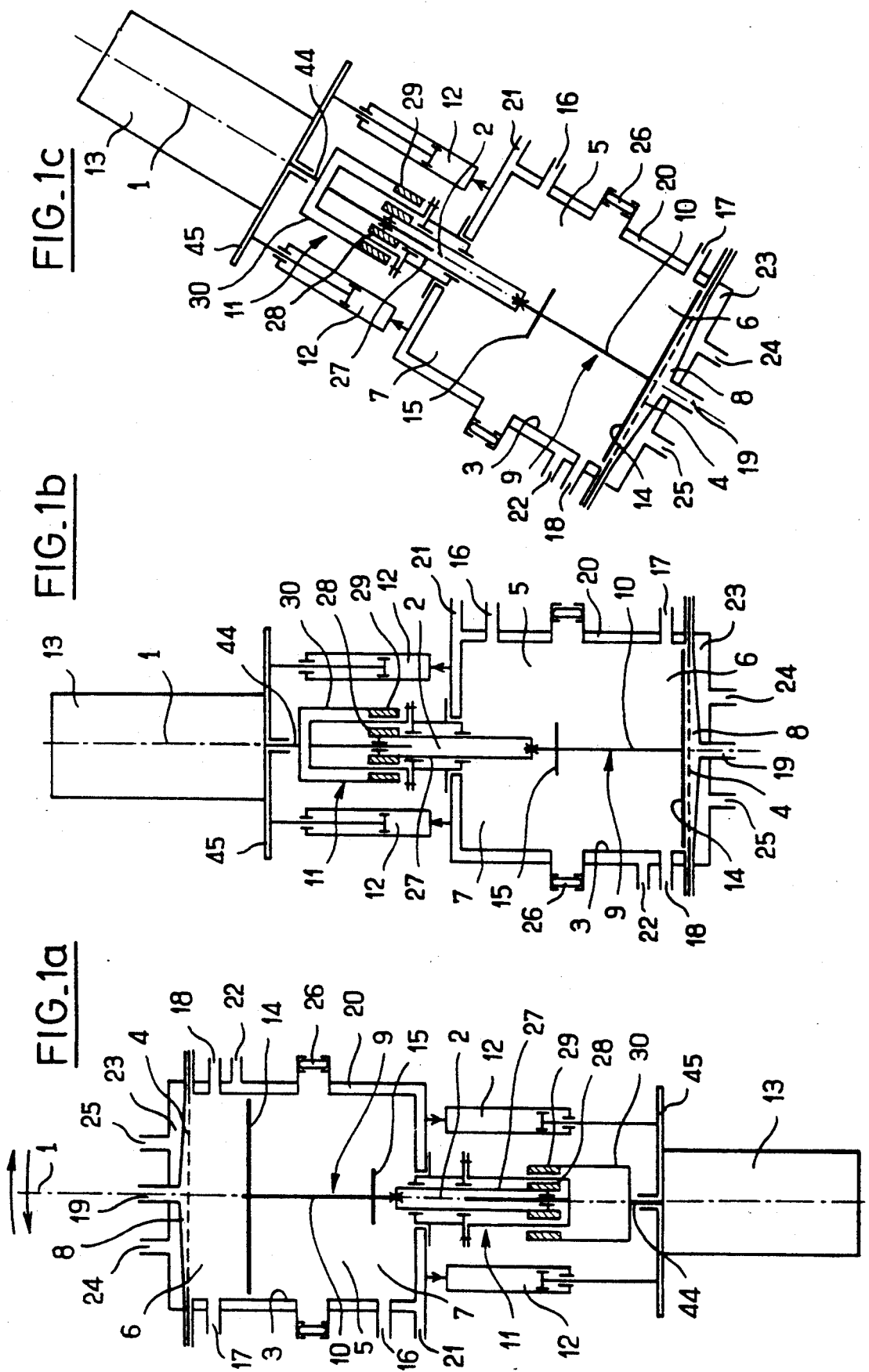

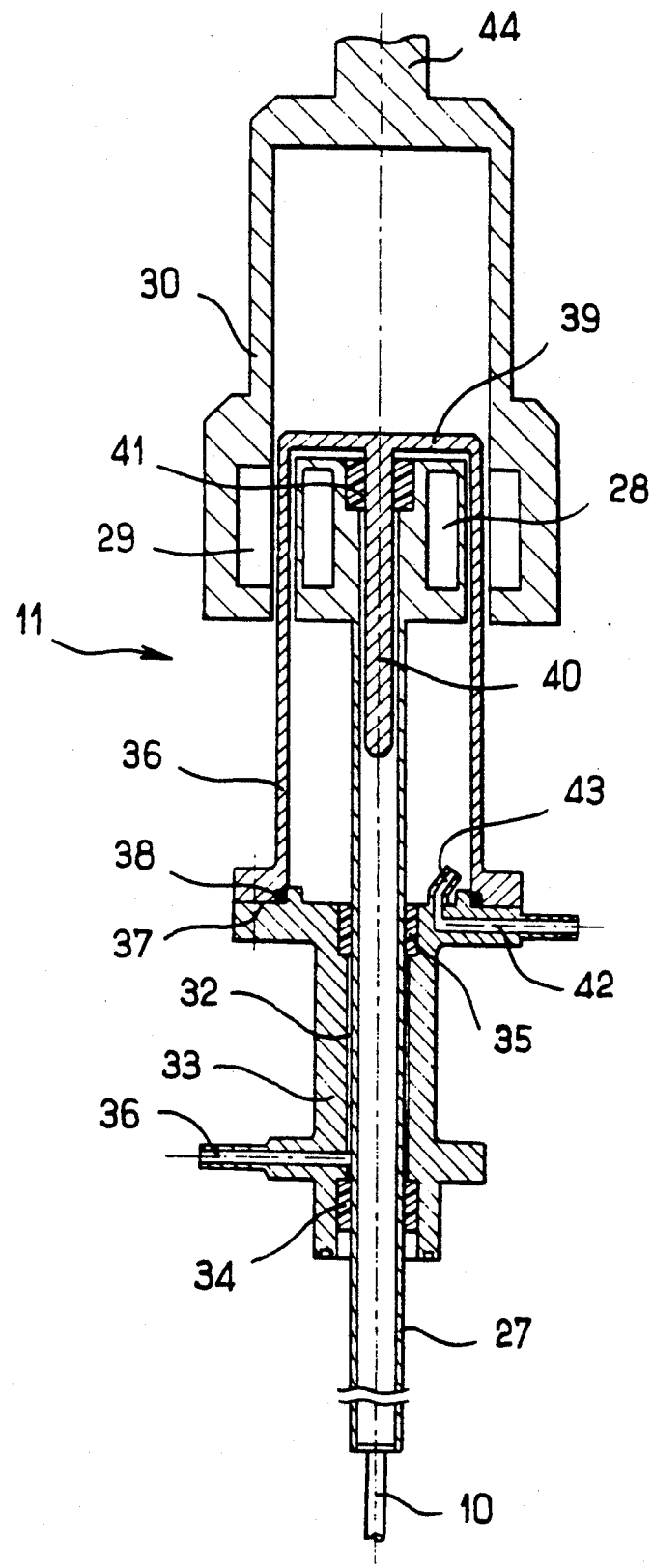
FIG_2

PROCESS FOR THE SYNTHESIS OF ZIEGLER-TYPE CATALYTIC SOLIDS OR SOLID CONSTITUENTS OF THE SAME

BACKGROUND OF THE INVENTION

1. Field of the Invention

The present invention relates to a process for the synthesis of Ziegler-type catalytic solids or solid constituents of the same.

2. Description of the Background

Ziegler-type catalytic solids, which are used in particular as polymerization or copolymerization catalysts of alpha-olefins in polymers having high molecular weights, are active solids produced when at least one compound of a transition metal belonging to Groups IV to VIII of the Periodic Table of Elements, especially a chloride, oxychloride, or alcoholate of a metal such as titanium, vanadium, zirconium, or chromium, comes into contact with at least one organometallic compound of a metal from Groups I to III of the Periodic Table of Elements, e.g., an organoaluminum or organomagnesium compound.

To produce olefinic polymers or copolymers having a low proportion of ash, the alpha-olefins are polymerized or copolymerized using powerful Ziegler-type supported solid catalysts.

These supported catalysts are generally obtained by combining a transition metal such as those mentioned above, for example a titanium compound such as $TiCl_4$, $TiCl_3$, or an alkyl titanate or chlorotitanate, with a magnesium compound, especially $MgCl_2$, or a precursor system of such a product, and possibly an organic compound which is an electron donor and/or a porous substrate of the silica or metallic oxide type, or a precursor system of this porous substrate. The solid products produced from this combination must be activated when used in the polymerization of alpha-olefins by adding catalysts consisting of reducing organometallic compounds, most often organoaluminum or organomagnesium, and, before activation, they may be designated by supported solid compounds of transition metals for supported Ziegler-type catalytic solids.

The operating methods used to synthesize Ziegler-type catalytic solids, whether supported or not, or to synthesize solid constituents of transition metals for these catalytic solids involve, first, the preparation of said catalytic solid or constituent as a suspension in an inert liquid medium, by bringing into contact the precursor ingredients of the catalytic solid or the constituent in said inert liquid medium in one or several steps, each of which is separated from the following one, if required, by filtration and possibly washing of the solid filtration residue and/or drying of the washed residue; next, the catalytic solid or constituent suspension is subjected to filtration and the solid produced by filtration is washed once or several times using an inert liquid for purification purposes and dried, the suspension is taken up or, in a preferred operation, the washed solid is dried and the dried solid is collected. The solid in suspension or the dried solid thus taken up constitutes the Ziegler-type catalytic solid or the transition metal solid constituent of the catalytic solid.

To conduct these various procedures, use is conventionally made of at least one unit composed of an agitated reactive apparatus followed in series by a drying filter; most often, a plurality of these units forms a chain. The placement in contact, in one or several steps, of the ingredients which form the catalytic solid or transition metal constituent in the inert liquid medium in order to produce the suspension is carried out in the agitated reactor or reactors, while the procedures for filtering the suspension, washing the filtered solid, and drying the washed solid are performed in the drying filter or filters, a process thus requiring most often several transfers of material from the agitated reactor or reactors to the associated drying filter or filters, and vice-versa. In addition to long synthesis time, this kind of procedure leads to appreciable losses of material during each transfer from a reactor to the associated filter, and introduces substantial risks of pollution of the catalytic solid thus prepared or of its component. It also entails substantial consumption of solvent, particularly for the various rinsing procedures.

Thus, a need continues to exist for a process for the synthesis of Ziegler-type catalytic solids or solid constituents of the same, which overcomes the above-mentioned drawbacks.

SUMMARY OF THE INVENTION

Accordingly, it is an object of the present invention to provide a process for the synthesis of Ziegler-type catalytic solids or solid constituents of the same, which avoids loss of material and risk of pollution during transfer of material between reactors and drying filters.

It is also an object of this invention to provide such a process which makes it possible to move quickly from one unitary operation to the other, thus producing an appreciable reduction of the overall duration of synthesis of the catalytic solid or of its constituents.

The above objects and others which will become apparent in view of the following disclosure are provided by a process for the synthesis of a Ziegler-type catalytic solid or of a transition metal solid constituent thereof, which entails:

a) preparing said catalytic solid or constituent thereof as a suspension in an inert liquid medium by contacting precursor ingredients of said catalytic solid or of said constituent thereof in said inert liquid medium in one or more steps, and b) drying said suspension, and collecting said catalytic solid or constituent; and wherein said process is conducted in a single multi-function reactor having a longitudinal axis and which can pivot around an axis which intersects perpendicularly with this longitudinal axis, said reactor comprising a chamber with temperature regulation means and being symmetrical in relation to the longitudinal axis of the reactor and being divided, by means of a filtering plate installed perpendicularly to the reactor axis, into a primary zone comprising a filtration space adjacent to the filtering plate and a reaction space set opposite this plate, and a secondary zone whose volume is smaller than that of the first, said primary zone being equipped, first, with a rotating means of agitation, and in particular a scraping device, installed near the filtering plate and functioning in the filtering space and a rotating agitation means functioning in the reaction space, and second, with at least one opening for the feed and evacuation of reagents which opens into the reaction space of the primary zone and at least one reagent and synthesized-product feed and evacuation orifice opening into the filtering space in proximity to the filtering plate and whose axis meets the longitudinal reactor axis perpendicularly to the pivoting axis of said reactor, while the secondary zone comprises at least one opening for the evacuation and injection of a fluid, said reactor being capable of pivoting 180° around the pivoting axis so as to move from one position, termed the lowered position in which the reactor axis is vertical and the secondary zone of the chamber is positioned above the primary zone, to a position termed the raised position, in which the reactor axis is vertical and the primary zone of the chamber is positioned above the secondary zone, said reactor also being capable of occupying intermediate positions inclined in relation to the vertical, said procedure also being characterized by the fact that each of the steps intended to ensure the contact of the precursor ingredients leading to the production of a suspension of a solid product in an inert liquid medium, as well as at least a portion of the suspension-washing operations, are performed in the reaction space of the primary zone while the reactor is in the lowered position, while each of the filtration and drying operations and other washing operations are performed in the filtration space of the primary zone while the reactor is in the raised position, the filtrates and washing liquids being drained through the orifice in the secondary zone while the drying of the filtered and washed solid is performed in a suitable manner, the solid in suspension or dried being extracted from the reactor through the opening in the primary zone in proximity to the filtering plate after the reactor has been tilted by pivoting so as to reach a position suitable for this extraction.

BRIEF DESCRIPTION OF THE DRAWINGS

FIGS. 1a, 1b and 1c each illustrate a schematic cross-section of a pivoting reactor used in accordance with the present invention, and, in particular, in the lowered position (1a) corresponding to a reactor phase; in the raised position (1b) corresponding to a filtration, washing or drying phase; and in an intermediate inclined position (2c) corresponding to an evacuation phase of the dried product.

FIG. 2 illustrates a schematic axial section of the magnetic drive system of the agitator installed in the pivoting reactor of FIGS. 1a, 1b and 1c.

In accordance with the present invention, it has been discovered that the above-mentioned difficulties can be remedied by performing the synthesis of the catalytic Ziegler-type solid or of its constituent in a single multi-function pivoting reactor of the agitated filtering type. This method avoids, in particular, the losses of material and the risks of pollution found during transfers of material between reactors and drying filters occurring during conventional procedures. Furthermore, this method makes it possible to move quickly from one unitary operation to the other, thus producing an appreciable reduction of the overall duration of synthesis of the catalytic solid or of its constituent. Finally, it makes possible the automated linking of unitary operations.

The procedure according to the invention for the synthesis of a Ziegler-type catalytic solid or of a transition metal solid constituent of this catalyst entails first, preparing the catalytic solid or constituent thereof as a suspension in an inert liquid medium by contacting the precursor ingredients of the catalytic solid or constituent thereof in said inert liquid medium in one or several steps, each of which is separated from the following one, if required, by filtration and possibly washing of the solid filtration residue and/or drying of said washed residue; next, the catalytic solid or constituent suspension undergoes filtration and the solid produced by filtration is washed once or several times using an inert liquid for purification purposes, the suspension is taken up or, preferably, the washed solid is dried and the dried solid is collected, the solid in suspension or dried solid thus constituting the Ziegler-type catalytic solid or its constituent, and the procedure is characterized by the fact that it is carried out in a single multi-function reactor having a longitudinal axis and which is capable of pivoting around an axis which intersects perpendicularly with this longitudinal axis, the reactor comprising a chamber with temperature regulation means which is symmetrical in relation to the longitudinal axis of the reactor and is divided, by means of a filtering plate installed perpendicularly to the reactor axis, into a primary zone comprising a filtration space adjacent to the filtering plate and a reaction space set opposite this plate, and a secondary zone whose volume is smaller than that of the first, said primary zone being equipped, first, with a rotating means of agitation, especially a scraping means, installed near the filtering plate and functioning in the filtering space, and a rotating agitation means functioning in the reaction space, and second, with at least one opening for the feed and evacuation of reagents which opens into the reaction space of the primary zone and at least one reagent and synthesized product feed and evacuation orifice opening into the filtering space in proximity to the filtering plate and whose axis meets the longitudinal reactor axis perpendicularly to the turning axis of said reactor, while the secondary zone comprises at least one opening for the evacuation and injection of a fluid, said reactor being capable of pivoting 180° around the pivoting axis so as to move from one position, termed the lowered position in which the reactor axis is vertical and the secondary zone of the chamber is positioned above the primary zone, to a position termed the raised position, in which the reactor axis is vertical and the primary zone of the chamber is positioned above the secondary zone, said reactor also being capable of occupying intermediate positions inclined in relation to the vertical, said procedure also being characterized by the fact that each of the steps intended to ensure the contact of the precursor ingredients leading to the production of a suspension of a solid product in an inert liquid medium, as well as at least a portion of the suspension washing operations, are carried out in the reaction space of the primary zone while the reactor is in the lowered position, while each of the filtration and drying operations and other washing operations are performed in the filtration space of the primary zone while the reactor is in the raised position, the filtrates and washing liquids being drained through the opening in the secondary zone while the drying of the filtered and washed solid is performed in any suitable manner, and preferably by means of an inert gas injected into the reactor through the opening in the secondary zone, the solid in suspension or dried being evacuated from the reactor through the opening in the primary zone in proximity to the filtering plate after the reactor has been tilted by pivoting so as to reach a position suitable for this evacuation.

The procedure according to the invention may be used for the synthesis of Ziegler-type unsupported catalytic solids, but its principal advantage lies in the synthesis of Ziegler-type supported catalytic solids or of supported transition metal solid constituents for these catalysts.

By implementing the present invention, one may perform the various conventional syntheses of Ziegler-type supported or unsupported catalytic solids or of transition metal solid constituents for Ziegler-type supported catalytic solids, these syntheses producing a suspension of a solid in an inert liquid medium from precursor ingredients.

A Ziegler-type unsupported catalytic solid may thus be prepared by producing a reaction in an inert liquid medium between at least one transition metal compound belonging to Groups IV to VIII of the Periodic Table of Elements and at least one organometallic compound of a metal from Groups I to III of said Periodic Table, in particular organoaluminum and/or organomagnesium, so as to form a product insoluble in said inert medium.

To prepare a Ziegler-type supported catalytic solid, a transition metal as mentioned above, a product capable substrate formation, and one of the previously-mentioned organometallic compounds may, for example, be placed in contact in an inert liquid medium. In this preparation method, advantage is gained by placing the transition metal compound in contact with the substrate and the placing the resulting product in contact with the organometallic compound, and the substrate may be formed from precursor ingredients and/or undergo a modification treatment, for example a chlorination procedure using a chlorinating agent such as HCl either immediately before or when it is placed in contact with the transition metal compound.

Similarly, to synthesize the solid transition metal constituent, a transition metal compound such as those previously specified may, for example, be placed in contact, in an inert liquid medium, with a product suitable for substrate formation, said substrate being producible from precursor ingredients and/or being capable of undergoing a modification treatment, for example a chlorination operation using a chlorinating agent such as HCl, either immediately before or during the procedure in which it is placed in contact with the transition metal compound.

The inert liquid medium in which the precursor ingredients of the catalytic solid or the transition metal solid constituent are placed in contact is most often a liquid hydrocarbon, in particular a liquid aliphatic hydrocarbon such as n-hexane, n-heptane, or isopentane.

The transition metal compound is, advantageously, a compound of titanium, vanadium, chromium, zirconium, or hafnium, which is preferably chosen from among $ToCl_44$, $TiCl_3$, $VCl_4$, $VOCl_3$, $CrCl_3$, $CrO_3$, vanadium acetylacetonate, chromium acetylacetonate, $Ti(OR)_pCl_{(4-p)}$, $Zr(OR)_p Cl_{(4-p)}$, and $Hf(OR)_pCl_{(4-p)}$, R designates an alkyl radical of $C_1$ to $C_8$ or an atom of hydrogen, and p is a number from 1 to 4.

The substrate used in the preparation of the supported catalytic solid or of the supported transition metal solid constituent of the catalytic solid is formed most often from a solid magnesium compound, in particular, $MgCl_2$, MgO $MgCO_3$, ClMgOH, magnesium phosphate, RMgCl, $Mg(OR)_2$, and ClMgOR, R designating an alkyl radical of $C_1$ to $C_8$, said magnesium compound being possibly associated with $AlCl_3$ or with the product formed from placing $AlAl_3$ in contact with an electron donor. The magnesium compound may also be prepared on site by reacting a chlorinating agent such as alkyl chloride with a compound $Mg(R)_2$, R having the above-mentioned meaning, or a mixture of this magnesium compound with an alumoxane or aluminosiloxane compound. The substrate may also consist of the combination of a solid magnesium compound, preprepared or prepared on site, such as the one mentioned previously, and of a porous oxide compound chosen from among $SiO_2$, $Al_2O_3$, $TiO_2$, $ZrO_2$, zeolites, mixed oxides containing $SiO_2$, and one or several metallic oxides from among $ZrO_2$, $TiO_2$, MgO and $Al_2O_3$, or of an organic product, whether polymeric or nonpolymeric, such as a product containing siloxane-type silicon.

The organometallic compound of a metal from Groups I to II of the Period Table of Elements used in the production of the Ziegler-type catalytic solid is a compound in which the metal is linked to a hydrocarbon radical by a carbon-metal bond. The organometallic compound may advantageously be a hydrocarbylaluminum compound selected from among isoprenylaluminum, alumoxane compounds corresponding to the formula:

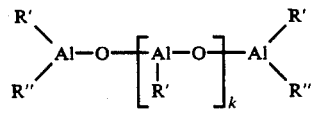

and alkylaluminums corresponding to the formula $Al(R')_qX_rH_s$, in which X represents Cl or a monovalent radical OR', R' is an alkyl radical of $C_1$ to $C_{16}$, and preferably $C_1$ to $C_{12}$, while q, r, and s are numbers such that $1<q<3$, $0<r<s$, and $0<s<2$, with $q+r+s=3$, each of the R'''s designating a radical R' or the R'''s forming a bivalent radical—0—, and k is a whole number between 0 and 18. Compounds such as $Al(C_2H_5)_3$, $Al(C_2H_5)_2Cl$, $Al(i—C_4H_9)_3$, $Al_2(C_2H_5)_3Cl_3$, $Al(i—C_4H_9)_2H$, $Al(C_2H_5)H_2$, $Al(C_2H_5)_2$ $(OC_2H_5)$, $Al(C_6H_{13})_3$, and $Al(C_8H_{17})_3$ are especially well suited.

The organometallic compound may also be selected from among the hydrocarbylmagnesium and hydrocarbylzinc compounds, and especially from among said compounds corresponding to the formulae YMgR' or YZnR', in which Y represents Cl or R' and R' is an alkyl radical of $C_1$ to $C_{16}$, and preferably $C_1$ to $C_{12}$. Examples of these compounds include, in particular, $Mg(C_2H_5)_2$, $Mg(i—C_4H_9)_2$, $C3lMg(C_2H_5)$, $Mg(C_6H_{13})_2$, $Mg(C_8H_{17})_2$, $Zn(C_2H_5)_2$, $Zn(i—C_4H_9)_2$, $ClZn(C_2H_5)$, and $Zn(C_3H_7)_2$.

The organometallic compound may also be a mixture of one or several of said hydrocarbylmagnesium compounds with one or several of said hydrocarbylzinc compounds and/or one or several of said hydrdocarbylaluminum compounds, in particular mixtures of an alkylaluminum compound and of an alkylmagnesium compound corresponding the above-cited formulae.

An electron donor consisting of at least one Lewis base may also be used in the preparation of the suspension of the Ziegler-type catalytic solid, supported or unsupported, or of the supported transition metal solid constituent. The electron donor may advantageously be chosen from among the alkyl-containing esters of aliphatic or aromatic carboxylic acids, especially methyl formate, methyl paratoluate, ethyl benzoate, butyl phthalate, ethyl phthalate, octyl phthalate, ethyl or butyl acetate, aliphatic or cyclic ethers, e.g., ethylic ether, diisoamylic ether, tetrahydrofuran, dioxane, ketones, and in particular, acetone, methylisobutylcetone, vinyl esters such as vinyl acetate, acrylic derivatives, and in particular alkyl acrylates or methacrylates and especially methyl methacrylate, and organic derivatives of silicon such as silanes like phenyltriethoxysilane, diphenylsimethoxysilane, and cyclohexylthyldimethoxysilane.

The inert liquid used for washing the solid formed from filtration of the suspension is advantageously selected form among the liquid hydrocarbons, and is composed in particular of one or several aliphatic hydrocarbons such as n-hexane, n-heptane, and isopentane.

The inert gas used to dry the filtered, washed solid may be selected from among various gases producing no action on said solid, for example nitrogen, rare gases, and mixtures of these latter.

Following the drying of the Ziegler-type catalytic solid and before it is removed from the pivoting reactor, said solid, which has been dried or put back into suspension, is placed in contact with a controlled quantity of one or several alpha-olefins of $C_2$ to $C_{12}$, for example ethylene, propylene, or 1-butene fed at any point whatever of the reactor, so as to form a prepolymer which coats the catalytic solid particles so as to produce a hydrocarbon active solid used to polymerize the alpha-olefins. This controlled polymerization is carried out in the gaseous or suspension phase in the pivoting reactor and at a temperature below the melting point of the hydrocarbon solid to be prepared using a quantity of alpha-olefin(s) such that the proportion of the active hydrocarbon-based solid represents less than 200 g per gram of catalytic solid.

When the solid produced using the procedure according to the invention has been prepared in the absence of an organometallic compound of a metal from Groups I to III of the Periodic Table of Elements, an organometallic compound is subsequently combined with the solid prepared according to the invention so as to form the Ziegler-type catalytic solid used for the polymerization of alpha-olefins. The organometallic compound thus used, which may be combined with an electron donor such as those previously specified, is also chosen from among the organometallic compounds, in particular hydrocarbylaluminum and/or hydrocarbylmagnesium, mentioned above.

In the Ziegler-type catalytic solid produced according to the invention, the ratio of the number of atoms of the metal or metals in Groups I to III of the Periodic Table of Elements to the number of atoms of the transition metal is comparable to the ratio in the corresponding catalytic solids prepared conventionally, and may thus, for example, have values smaller than 200.

Other advantages and features of the invention will emerge from a reading of the following description of an application of the invention providing as a non-limiting example and with reference to the attached drawings described hereinbelow.

FIGS. 1a, 1b, and 1c each represent a schematic cross-section of a pivoting reactor used according to the invention and in the lowered position (FIG. 1a) corresponding to a reaction phase, in the raised position (FIG. 1b) corresponding to a filtration, washing or drying phase, and in an intermediate inclined position (FIG. 1c) corresponding to an evacuation phase of the dried product; and FIG. 2 is a schematic axial section of the magnetic drive system of the agitator installed in the pivoting reactor in FIGS. 1a, 1b, and 1c.

With reference to FIGS. 1a, 1b, and 1c, the multifunction pivoting reactor used in the invention procedure has a longitudinal axis 1 and can pivot around an axis 2 which intersects perpendicularly with this longitudinal axis. The reactor comprises a chamber 3 which is symmetrical in relation to the axis 1 of the reactor and is divided by a filtering plate 4 arranged perpendicularly to the reactor axis into a cylindrical primary zone 5 comprising a filtering space 6 adjacent to the filtering plate and a reaction space 7 set opposite this plate, and a secondary zone 8 preferably conical in shape and having a lesser volume than the primary zone. The primary zone 5 of the chamber 3 is fitted with an agitator 9 comprising a shaft 10 whose axis coincides with the longitudinal axis 1 of the reactor and which can be driven both in translational motion and in rotation by a magnetic drive system 11 linked to jacks 12 and to a motor 13 and whose description will be provided in more detail below, a movable scraping device 14 mounted at the end of the shaft 10 toward the filtering plate and perpendicular to said shaft, said movable scraping device having controlled translational travel so as to function in the filtering space fairly close to the filtering plate, and a movable agitation device 15 mounted on the shaft 10 perpendicular to this latter and in such a way as to function in the reaction space 7. The primary zone comprises, furthermore, a reagent feed and evacuation orifice 16 opening into the reaction space 7 and several openings positioned radially at point 17 for the feed and evacuation of reagents and the evacuation of the synthesized product, each of said orifices opening into the filtering space 6 near the filtering plate 4 and having an axis which intersects with reactor axis I perpendicularly to the pivoting axis 2 of said reactor. The secondary zone 8 of the chamber 3 comprises an opening 19 for the evacuation or injection of a liquid or gaseous fluid. The primary zone 5 of the chamber 3 is fitted with a double jacket 20 to allow the circulation of a heat-transfer fluid, this double jacket being fitted with ducts 21 and 22 respectively for the feed and evacuation of the heat-transfer fluid circulating within it, while the secondary zone 8 of the chamber 3 is equipped with a double jacket 23 for the circulation of a heat-transfer fluid, said double jacket being equipped with ducts 24 and 25 for the feed and evacuation, respectively, of the heat-transfer fluid. The circulation of a heat-transfer fluid having a suitable temperature in the double jackets 20 and 23 makes it possible to maintain the temperature in the chamber at the desired value. The flows of the heat-transfer fluid circulating in the double jackets 20 and 23 are regulated as a function of the indications supplied by a temperature sensor (not shown) mounted in the chamber 3. Said chamber also comprises a pressure sensor mounted on its wall (not shown) and inspection windows 26 providing a view of the chamber interior, each of which passes in water-tight fashion through the double jacket 20 of said chamber.

The magnetic system 11 driving the agitator 9 comprises a tubular shaft 27 whose axis coincides with the longitudinal axis of the reactor and one whose ends is attached to the agitator shaft 9 and whose other end is fitted with a magnetic annular weight 28, said weight 28 working in conjunction with a magnetic annular weight 29 which encloses it and which forms a part of the drive rotor 30 driven in rotation by the motor 13 and in translational motion by the jacks 12.

As shown in greater detail in FIG. 2, the tubular shaft 27, which is connected to one of the ends of shaft 10 of the agitator 9 and which comprises at the other end the annular magnetic weight 28, has an intermediary part which slides in water-tight fashion in a cylindrical bore 32 in a guide column 33 fastened to the pivoting reactor toward the reaction space 7 of the primary zone 5. The water-tight sliding operation of the tubular shaft in the bore 32 is made possible, for example, by two bearings 34 and 35 made of a self-lubricating material, e.g., polytetrafluoroethylene loaded with graphite or glass fibers, each of the bearings being mounted in a housing at each end of the bore 32 of the guide column 33 and both bearings clamping the tubular shaft 27 tightly. The guide column is also fitted with a connector 36 having an opening which opens into the bore between the bearings 34 and 35, this connecting piece, which is optional, allowing the injection, if needed, of a cleaning fluid into the bore 32 or the pressurization of this latter using an inert gas. A guide cap 36, cylindrical in shape and preferably with a flat bottom 39, is mounted in a water-tight manner on the free end 37 of the guide column, water-tightness being advantageously ensured by an O-ring sealing joint 38. The guide cap 36 covers the annular magnetic weight 28 and has, connected to its bottom 39, a cylindrical guide shaft 40 coaxial to the tubular shaft 27 and on which said shaft 27 slides impermeably, said impermeable sliding action being advantageously ensured by a bearing 41 made of a self-lubricating material, for example polytetrafluoroethylene loaded with graphite or glass fibers and mounted in a housing in the magnetic weight 28 at the end of the tubular shaft 27, this bearing clamping said tubular shaft tightly. The height of the cylindrical part of the cap 26, which determines the range of translational motion of the weight 28 and, consequently, of the agitator 9, is chosen so that said motion allows the desired translational movement of the movable scraping device 14 in the filtration space 6 of the primary zone. In proximity to its free end 37, the guide column 33 has an opening 42 which empties into a connecting piece 43 inside the guide cap 36, this opening (optional but preferred) allowing, if needed, the injection of a cooling or cleaning fluid into the cap 36. said cap is covered, in turn, by a drive rotor 30 comprising an external annular magnetic weight 29 which encloses said cap so as to work magnetically in conjunction with the annular magnetic weight 28, the result being that the rotational or the translational movement of the rotor 30 produces a rotation or translational movement, respectively, of the magnetic weight 28 connected to the tubular shaft, and consequently, the rotation or the translational movement, respectively, of the agitator 9. The rotor 30 is linked to means which allow, first, its translational movement and second, its rotation, said translational motion being chosen so as to correspond to the possible line of travel of the weight 28 in the cap 36. Thus, as shown diagrammatically in FIGS. 1a, 1b and 1c, the means which provide for the translational travel and the rotation of the rotor 30 consist advantageously of a motor 13 which generates the rotation of a shaft 44 forming one piece with the rotor 30 and which is coaxial to the reactor axis, said motor being mounted on a support plate 45 which is, in turn, supported by jacks 12 having an axis parallel to the reactor axis and attached to the pivoting reactor on the same side as the guide column 33, these jacks ensuring the translational notion of the plate 45 through which the shaft 44 connected to the rotor 30 passes, and, in consequence, the translational motion of the rotor 30 which, by means of the shaft 44, is connected to the motor 13 mounted on this plate.

By pivoting around the axis 2 in the direction of the arrows, the reactor may be placed in position, termed the lowered position (FIG. 1a) in which the reactor axis 1 is vertical and the secondary zone 8 of the chamber 3 is positioned above the primary zone 5, the reaction space 7 then being located at the bottom of the chamber 3. From this position, by pivoting 180° around the axis 2, the reactor is drawn into position, called the raised position (FIG. 1b), in which the axis I of the reactor remains vertical but in which the primary zone 5 of the chamber 3 is positioned above the secondary zone 8, the filtration space 6 then being located at the bottom of the primary zone 5. From this position, by pivoting at the appropriate angle, e.g., at approximately 45°, around the axis 2, the reactor is drawn into the inclined position (FIG. 1c) suitable for the evacuation of the synthesized product from the reactor through duct 17 or lot depending on the case (duct 17 in the case shown in FIG. 1c).

The various operations placing in contact the precursor ingredients of the Ziegler-type catalytic solid or of the supported transition metal constituent of the Ziegler-type catalytic slid are conducted in the reaction space 7 of the primary zone 5 while the reactor is in the raised position, the position of the agitator 9 in relation to the filtering plate 4 being regulated by operating the jacks 12, so that the rotating movable device 15 of said agitator functions within the reaction space 7.

The filtering operations performed on the solid suspension produced during each of the aforementioned procedures for placing the ingredients in contact and for drying the filtered and washed solid, as well as some of the suspension washing operations, are performed in the filtration space 6 of the primary zone 5 while the reactor is in the raised position, the position of the agitator 9 in relation to the filtering plate 4 being regulated by operating the jacks 12, so that the movable scraping device 14 of said agitator produces a smoothing action or penetrates in the desired way the solid cake undergoing filtration or washing or the solid being dried, so as to avoid the agglomeration of solid particles or preferential flows of gas.

The synthesized product is evacuated from the reactor through the duct 17 as a dry pulverulent or particulate mass, after the reactor has been moved from the raised to the appropriate inclined position.

The present invention will now e further illustrated by reference to the following examples which are provided solely for illustration and are not intended to be limitative.

EXAMPLE 1

The synthesis of a transition metal constituent supported on $MgCl_2$ was conducted by proceeding according to the invention (Test 1.A) or according to prior art (Test 1.B).

TEST 1.A

The procedure was undertaken in a pivoting reactor similar to the one shown in FIGS. 1a, 1b, and 1c and in which the cylindrical primary zone 5 has a volume of 20 l and a height-diameter ratio of 1.6, while the filtering plate 4 has a mesh dimension of 20 $\mu$m. The movable agitation component 15 of the agitator 9 was shaped like a thin, three-bladed spiral having a diameter of 150 mm while the movable scraping component 14 of said agitator had two blades, and was for example, of the type manufactured by the GUEDU company. The movable scraping device was able to function in the filtration space 6 between the plane of the filtration plate 4 and a plane parallel to the plane of said plate and separated from it by a distance of 100 m, while the movable agitation device was able to function in the reaction space 7 between the bottom of said space, when the reactor is in the lowered position, and a plane parallel to the bottom of the reaction space 7 at a distance of 100 mm from this bottom.

Synthesis progressed as indicated below a. The pivoting reactor, once flushed out with nitrogen, was placed in the lowered position (FIG. 1a) and kept at a temperature of 55° C. by circulating a heat-transfer fluid in the double jackets 20 and 23 and under agitation corresponding to an agitator rotation speed of 150 revolutions per minute.

2390 g of hexane, 13.5 moles of 30% butylethylmagnesium in heptane, and 0.53 mole of diisoamylic other were fed into reaction space 7 through duct 16 of said reactor.

After agitating for 1½ hours, a mixture of 4.83 moles of diisoamylic ether and 35.1 moles of tertiobutyl chloride were fed by a pump through the duct 16, the feed of this mixture occurring in three hours under agitation and thus corresponding to an agitator 9 rotation speed of 200 revolutions/minute.

At the end of these operations, the reaction space 7 of the reactor held a suspension of an $MgCl_2$-based solid in hexane.

b. The pivoting reactor was then swung into the raised position (FIG. 1b) in order to filter the suspension, agitation having been stopped. The dried filtration cake was put back into suspension by feeding 6000 g of hexane into the filtration space 6 through the duct 16 and agitation was resumed until an agitator 9 rotation speed of 150 revolutions/minute was achieved.

c. The pivoting reactor was then put back into the lowered position and, while keeping the agitation value specified in (b), d quantity of gaseous HCl was fed into the primary zone 5 of the reactor, thus producing partial HCl pressure in the chamber 3 of the reactor equal to 500 mbars. Agitation continued for 1 hour. The chamber was then degassed by decompression and nitrogen bubbling was then produced in the suspension contained in the reaction space 7 in order to eliminate the HCl which had not undergone reaction.

d. The pivoting reactor was once again swung into the raised position to effect the filtration of the suspension. Agitation was halted. At the end of filtration, the filtration cake was washed twice, both times using 4000 g of hexane fed through the duct 18. The washed cake was then put back in suspension by adding 4000 g of hexane into the filtration space 6 through duct 1a, and agitation was resumed, the agitator rotation speed reaching 150 revolutions/minute.

e. The reactor was then swung into the lowered position and its temperature raised to 80° C. While maintaining the agitation value specified in (d) and a temperature of 80° C., 10 5 (sic) moles of $TiCl_4$ were fed into the reaction space 7 of the primary zone 5 of the reactor over 2 hours.

f. The reactor was then pivoted into the raised position and cooled to 40° C. to conduct the filtration of the suspension contained in the primary zone 5 of said reactor. Following filtration, the filtration cake was washed four times, each time using 6000 g of hexane added through duct 18. The washed cake was then dried. To accomplish this, the movable scraping device 14 on the agitator 9 was positioned so as to penetrate the cake and the agitator 9 rotation speed was adjusted to 60 revolutions/minute. Simultaneously, a current of nitrogen was injected through the duct 19 of the secondary zone 8 in order to fluidize the solid particles of the cake and thus to force out the residual solvent by means of the nitrogen current, so as to obtain a dry pulverulent solid.

g. The reactor was finally drawn into the inclined position shown schematically in FIG. 1c, in order to extract the dry pulverulent product contained in the filtration space 6.

1410 g of dry powder of the supported transition metal constituent having an average particle diameter of 45 μm. To perform the various aforementioned operations, a total volume of hexane of 67.25 liters was used.

Test 1.B (comparative)

Use was made of conventional equipment comprising a cylindrical precipitation reactor having a rounded bottom and a capacity of 20 l. It was fitted with a three-bladed spiral agitator and a 40-1 agitated drying filter connected in series with the precipitation reactor.

Synthesis progressed as indicated below a. The precipitation of the $MgCl_2$ substrate in the form of a suspension in hexane was carried out by working within the agitated reactor under the same conditions as those specified in step (a) of Test 1.A.

b. The suspension was transferred to the agitated drying filter by siphoning and the reactor was rinsed with 2040 g of hexane, which were then siphoned to the drying filter.

After filtration, the dried cake was put back in suspension under agitation by adding 6000 g of hexane. The suspension thus obtained was then transferred to the reactor. The filter was cleaned using 8 liters of solvent, which were then discarded.

c. The suspension contained in the reactor was treated using gaseous Hcl as indicated in step (c) in Test 1.A.

d. The HCl-treated suspension was transferred to the drying filter. The reactor was then rinsed using 2640 g of hexane, which were also siphoned to the drying filter.

After filtration, the dried cake was washed twice then returned to suspension as indicated in step (d) in Test 1.A.

The suspension was then siphoned to the reactor and the drying filter cleaned using 8 liters of solvent, which were subsequently discarded.

e. The suspension in the reactor was treated with $TiCl_4$, as indicated in step (e) of Test 1.A.

f. The suspension resulting from the $TiCl_4$ treatment was then siphoned to the drying filter. The reaction space was rinsed with 2500 g of hexane which were then transferred to the drying filter, said suspension being treated in the drying filter (filtration, washing, and drying), as indicated in step (f) of Test 1.A.

g. The dried solid in pulverulent form was collected in a volume kept bathed in nitrogen, the transfer being carried out by rotating the agitation blade of the drying filter at a speed of 60 revolutions/minute.

1290 g of a dry powder of the supported transition metal constituent having an average particle diameter of 42 μm were collected. To carry out the various operations described above, a total volume of solvent of 102.4 l was used. Furthermore, five transfers of suspensions outside of and into the reactor were needed during synthesis.

EXAMPLE 2

Synthesis of a transition metal solid constituent supported on silica was carried out by following the invention procedure (Test 2.A) and a procedure according to prior art (Test 2.B).

Test 2-A:

The procedure was undertaken in a pivoting reactor similar to that used in Test 1.A, synthesis progressing as follows:

a. The pivoting reactor, flushed out with nitrogen, was placed in the lowered position (FIG. 1a) and kept at a temperature of 20° C. by circulating a heat-transfer fluid in double jackets 20 and 23. 2000 g of a silica gal in powdered form without water, 8 liters of hexane, and 3 moles of hexamethyldisilazane were fed into the reaction space 7 through duct 16 of said reactor. The contents of reaction space 7 were then heated to 55° C. and agitated at that temperature for 1 hour at an agitator 9 rotation speed of 1.50 revolutions/minute.

b. After operation (a), the reactor was pivoted into the raised position (FIG. 1b) to filter the suspension, agitation having been stopped. The filtration cake was washed twice in hexane by using each time 5 liters of hexane injected into the filtration space through duct 18, then dried by fluidizing at 55° C. by injecting a nitrogen current at the appropriate temperature through duct 19 of the secondary zone 8.

c. The reactor was swung back into the lowered position. 8.36 moles of n-butyl dry butyl magnesium and 2.09 moles of triisobutylaluminoxane in a 20% solution in hexane were fed through duct 16 into the reaction space 7 kept at 55° C. under agitation at 150 revolutions/minute.

The suspension was kept for 1 hour at the aforementioned temperature and agitation speed, and the reactor was then cooled to 20° C.

d. The reactor was the swung into the raised position in order to filter the cooled suspension at 20° C. The filtration cake was then put back into suspension under agitation at 150 revolutions/minute in 8 liters of hexane fed through duct 18.

e. The reactor was once again placed in the lowered position, and, while maintaining the temperature and agitation conditions in step (d), 20 moles of gaseous HCl were injected into the primary zone 5 over 1½ hours. After degassing the chamber 3 of the reactor by decompression, the unreacted HCl was then evacuated by nitrogen bubbling in the HCl-treated suspension.

f. With the reactor still in the lowered position and its contents kept at 55° C. under agitation at 150 revolutions/minute, a 5.5 mole quantity of $TiCl_4$ was fed into the reaction space 7 through duct 16, this operation being carried out over 1 hour.

g. The reactor was swung into the raised position to carry out filtration of the $TiCl_4$-treated suspension at 40° C. After filtration, the filtration cake was washed twice, each time with 5 liters of hexane added through duct 18. After the filtration following the final washing, the filtration cake was washed. To accomplish this, the movable scraping component 14 of the agitator 9 was positioned as to penetrate the cake and the agitator rotation speed was adjusted to 60 revolutions/minute. Simultaneously, a current of nitrogen was injected through duct 19 of the secondary zone 8 so as to fluidize the solid particles of the cake and thus to draw off the residual solvent by means of the nitrogen current, so as to obtain a dry pulverulent solid.

h. The reactor was finally drawn into the inclined position schematized in FIG. 1c in order to extract the dry pulverulent product contained in the filtration space 6.

3310 g of the dry powder of the supported transition metal constituent were collected in a volume kept bathed in nitrogen. To carry out the various operations described above, a total volume of hexane of 36 liters was used.

Test 2.B (comparative)

The procedure was carried out in conventional equipment similar to that used in Test 1.B, synthesis progressing as follows:

a. Treatment of the silica support was carried out by working in the conventional agitated reactor under the same conditions as those used in step (a) of Test 2.A.

b. The treated silica suspension was siphoned to the drying filter and the reactor was rinsed with 4 liters of hexane, which were then siphoned to the drying filter.

After filtration, the dried cake was washed twice, each time using 5 liters of hexane, then dried by fluidizing at 55° C. by injecting a current of nitrogen at the appropriate temperature into the drying filter. The dry product obtained, in powder form, was extracted into a volume bathed in nitrogen, said volume then being connected to the reactor so as to feed the powder into this latter by gravity. The filter was then washed with 8 liters of hexane, which were then discarded.

c. The ingredients used in step (c) of Test 2.A were added to the reactor contents, while working under the temperature and agitation conditions called for in that step. The suspension thus formed was then kept for 1 hour under said temperature and agitation conditions, after which the reactor was cooled to 20° C.

d. The suspension was siphoned to the drying filter and the reactor was rinsed with 4 liters of hexane, which were then siphoned to the drying filter.

After filtration, the dried cake was put back in suspension under agitation in 8 liters of hexane. The suspension thus formed was then siphoned to the reactor. The filter was cleaned using 8 liters of solvent, which were then discarded.

e. The suspension contained in the reactor was treated using gaseous HCl as indicated in step (e) in Test 2.A.

f. The suspension treated with HCl was subjected to treatment with $TiCl_4$ as indicated in step (f) of Test 2.A.

g. The suspension treated with $TiCl_4$ was siphoned to the drying filter. The reactor was rinsed with 4 liters of hexane which were then transferred after use to the drying filter. The suspension was treated in the drying filter (filtration, washing, and drying) under conditions comparable to those used in step (g) in Test 2.A.

h. The dried solid in pulverulent form was collected under nitrogen in a volume kept bathed in nitrogen, the transfer being carried out by rotating the agitation blade of the drying filter at a speed of 60 revolutions/minute.

3100 g of a dry powder of the supported transition metal constituent were collected. To carry out the various operations described above, a total volume of solvent of 64 l was used. Furthermore, one transfer of dry powder and four transfers of suspensions proved necessary.

Having described the present invention, it will now be apparent to one of ordinary skill in the art that many changes and modifications can be made to the above embodiments without departing from the spirit and the scope of the present invention.

What is claimed as new and desired to be secured by letters patent of the United States is:

1. A process for the synthesis of a solid Ziegler catalyst or of a transition metal solid constituent thereof, which comprises:
   a) preparing said solid Ziegler catalyst or constituent thereof as a suspension in an inert liquid medium by contacting precursor ingredients of said solid catalyst or of said constituent in said inert liquid medium in one or more steps, and
   b) drying said suspension, and collecting said solid catalyst or constituent thereof; and wherein said process is conducted in a single multi-function reactor having a longitudinal axis and which can pivot around an axis which intersects perpendicularly with this longitudinal axis, said reactor comprising a chamber with temperature regulation means and being symmetrical in relation to the longitudinal axis of the reactor and being divided, by means of a filtering plate installed perpendicularly to the reactor axis, into a primary zone comprising a filtration space adjacent to the filtering plate and a reaction space set opposite this plate, and a secondary zone whose volume is smaller than that of the first, said primary zone being equipped, first, with a rotating means of agitation, installed near the filtering plate and functioning in the filtering space and a rotating agitation means functioning in the reaction space, and second, with at least one opening for the feed and evacuation of reagents which opens into the reaction space of the primary zone and at least one reagent and synthesized-product feed and evacuation orifice opening into the filtering space in proximity to the filtering plate and whose axis meets the longitudinal reactor axis perpendicularly to the pivoting axis of said reactor, and the secondary zone comprises at least one opening for the evacuation and injection of a fluid, said reactor being capable of pivoting 180° around the pivoting axis so as to move from one position, termed the lowered position in which the reactor axis is vertical and the secondary zone of the chamber is positioned above the primary zone, to a position termed the raised position, in which the reactor axis is vertical and the primary zone of the chamber is positioned above the secondary zone, said reactor also being capable of occupying intermediate positions inclined in relation to the vertical, said procedure also being characterized by the fact that each of the steps intended to ensure the contact of the precursor ingredients leading to the production of a suspension of a solid product in an inert liquid medium, as well as some of the suspension-washing operations, are performed in the reaction space of the primary zone while the reactor is in the lowered position, while each of the filtration and drying operations and other washing operations are performed in the filtration space of the primary zone while the reactor is in the raised position, the filtrates and washing liquids being drained through the orifice in the secondary zone while the drying of the filtered and washed solid is performed in a suitable manner, the solid in suspension or dried being extracted from the reactor through the opening in the primary zone in proximity to the filtering plate after the reactor has been tilted by pivoting so as to reach a position suitable for this extraction.

2. The process according to claim 1, wherein the solid Ziegler catalyst is prepared by reacting, in an inert liquid medium, at least one transition metal compound belonging to Groups IV to VIII of the Periodic Table of Elements with at least one organometallic compound of a metal from Groups I to III of said Periodic Table of Elements so as to produce an insoluble product in said inert medium.

3. The process according to claim 1, wherein a supported solid Ziegler catalyst is prepared by placing in contact, in an inert liquid medium, a compound of a transition metal belonging to Groups IV to VIII of the Periodic Table of Elements, a product suitable for substrate formation, and an organometallic compound of a metal from Groups I to III of said Period Table of Elements.

4. The process according to claim 1, wherein the transition metal compound is placed in contact with the substrate, and then the resulting product is placed in contact with the organometallic compound.

5. The process according to claim 4, wherein the substrate is formed from precursor ingredients and wherein the substrate undergoes a treatment with a chlorinating agent immediately after it has been placed in contact with the transition metal compound or both or during said contact operation.

6. The process according to claim 1, wherein a solid unsupported transition metal component is prepared by placing in contact, in an inert liquid medium, a compound of a transition metal belonging to groups IV to VIII of the Periodic Table of Elements with a compound suitable for substrate formation, said substrate being capable of formation based on precursor ingredients or being capable of undergoing treatment with a chlorinating agent immediately after it has been placed in contact with the transition metal compound or during said contact operation, or both.

7. The process according to claim 3, wherein the transition metal compound is a compound of titanium, vanadium, chrome, zirconium, or hafnium.

8. The process according to claim 3, wherein the substrate used in the preparation of the supported catalytic solid or of the supported solid transition metal component is a solid magnesium compound used alone or in association with a porous oxide compound chosen from among $SiO_2$, $Al_2O_3$, $TiO_2$, $ZrO_2$, zeolites, mixed oxides containing $SiO_2$, and one or several metallic oxides from among $ZrO_2$, $TiO_2$, MgO and $Al_2O_3$, or of a solid organic product, polymeric or non-polymeric.

9. The process according to claim 2, wherein the organometallic compound is selected from among isoprenylaluminum, alumoxane compounds corresponding to the formula:

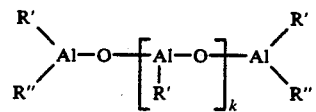

and alkylaluminums corresponding to the formula $Al(R')_q X_r H_s$, in which X represents Cl or a monovalent radical OR', R' is an alkyl radical of $C_1$ to $C_{16}$, while q, r, and s are numbers such that $1 < q < 3$, $0 < r < s$, and $0 < s < 2$, with $q + r + s = 3$, each of the R'''s designating a radical R' or the R'''s forming a bivalent radical —O—, and k is a whole number between 0 and 18.

10. The process according to claim 1, wherein an electron donor consisting of at least one Lewis base is used to prepare the suspension of the solid Ziegler catalyst or of the supported transition metal solid component.

11. The process according to claim 1, wherein the inert liquid used both in the preparation of the suspension of the catalytic solid or of the supported transition metal solid component and for the washing of the solid produced by filtration of the suspension is selected from among liquid hydrocarbons and comprises one or several aliphatic hydrocarbons.

12. The process according to claim 2, wherein, after drying of the solid Ziegler catalyst and before its extraction from the pivoting reactor, the solid that has been dried or put back in suspension is placed in contact with a controlled quantity of one or several alpha-olefins at $C_2$ to $C_{12}$, injected at any point whatever of the reactor so as to form a prepolymer which coats the catalytic solid particles, in order to produce an active hydrocarbon-based solid used for the polymerization of the alpha-olefins.

13. The process according to claim 1, wherein the movable device and the movable agitation device in the primary zone of the pivoting reactor are capable of translational motion along the reactor axis, in addition to being movable in rotation.

14. The process according to claim 5, wherein said chlorinating agent comprises HCl.

15. The process according to claim 6, wherein said chlorinating agent comprises HCl.

16. The process according to claim 1, wherein said rotating means of agitation is a scraping device.

* * * * *